(12) United States Patent
Takeuchi et al.

(10) Patent No.: US 7,480,231 B2
(45) Date of Patent: Jan. 20, 2009

(54) DIGITAL DUBBING DEVICE

(75) Inventors: Yoshikazu Takeuchi, Saitama (JP); Katsumi Amano, Saitama (JP); Shisei Cho, Saitama (JP)

(73) Assignee: Pioneer Corporation, Tokyo (JP)

( * ) Notice: Subject to any disclaimer, the term of this patent is extended or adjusted under 35 U.S.C. 154(b) by 303 days.

(21) Appl. No.: 10/593,497

(22) PCT Filed: Mar. 8, 2005

(86) PCT No.: PCT/JP2005/003972

§ 371 (c)(1),
(2), (4) Date: Sep. 20, 2006

(87) PCT Pub. No.: WO2005/093750

PCT Pub. Date: Oct. 6, 2005

(65) Prior Publication Data

US 2008/0031108 A1 Feb. 7, 2008

(30) Foreign Application Priority Data

Mar. 29, 2004 (JP) .............................. 2004-096007

(51) Int. Cl.
*G11B 7/00* (2006.01)
(52) U.S. Cl. ............................... 369/124.06; 369/59.26
(58) Field of Classification Search ........................ None
See application file for complete search history.

(56) References Cited

U.S. PATENT DOCUMENTS

| 6,661,422 B1 * | 12/2003 | Valmiki et al. .............. 345/530 |
| 2003/0072229 A1 | 4/2003 | Hasegawa et al. |
| 2005/0281140 A1 * | 12/2005 | Verbakel et al. .......... 369/30.09 |

FOREIGN PATENT DOCUMENTS

| JP | 6-028786 A | 2/1994 |
| JP | 7-037327 A | 2/1995 |
| JP | 7-037341 A | 2/1995 |
| JP | 10-162558 A | 6/1998 |
| JP | 11-134793 A | 5/1999 |
| JP | 2002-222564 A | 8/2002 |
| JP | 2003-059181 A | 2/2003 |

* cited by examiner

*Primary Examiner*—Paul Huber
(74) *Attorney, Agent, or Firm*—Foley & Lardner LLP (57) ABSTRACT

A digital dubbing device that compresses and stores music data for each sound unit includes a music data counter that counts the number of samples of music data when the music data is to be compressed, and detects a music data stream located in the end part of the sound unit from the music data based on TOC information of the music data and the number of samples of the music data counted; a data storage unit that stores the music data stream detected; a music data comparator that detects a music data stream identical to the music data stream stored from the music data when dubbing of the music data is interrupted; and a controller that causes the dubbing of the music data to be restarted from music data following the music data stream detected.

7 Claims, 8 Drawing Sheets

DIGITAL DUBBING DEVICE

This application is a 371 of PCT/JP05/03972, filed Mar. 8, 2005.

TECHNICAL FIELD

The present invention relates to a digital dubbing device for dubbing digital information.

BACKGROUND ART

As a dubbing system of dubbing a digital audio signal of music recorded on a music CD (Compact Disc), there is a method of reproducing the music on the music CD track by track, compressing the music, and then storing (recording) the music compressed in a recording medium.

When the music is dubbed for each track, however, a lot of time is required for controlling a CD drive for reproducing the music CD. Therefore, unnecessary silent data is recorded in the front part (start portion) of a track and the end part (end portion) of the track, and this does not allow faithful dubbing. Furthermore, when dubbing is performed track by track, pose/play is performed for each track. Therefore, time-based overhead occurs in a dubbing process.

As the dubbing system, there is also a method of reproducing the all tracks on the music CD at a time to compress and recording them as a whole in a recording medium, and then dividing the whole into tracks.

A digital dubbing device described in Patent document 1 detects elapsed-time information (subcode data) in a program from a digital signal sent from a digital-signal reproducing unit, and determines that a track is started when it is continuously detected predetermined times or more that the elapsed-time information is within a predetermined time range including the start time of the program. When it is determined that the track is started, then the digital signal is started to be recorded.

Patent document 1: Japanese Patent Application Laid-Open No. H10-162558

DISCLOSURE OF INVENTION

Problem to be Solved by the Invention

In the conventional technology, however, the beginning of a track is determined (inter-track detection) not for each digital-audio-signal compression-process but for each subcode. Therefore, when sound skipping or the like occurs during dubbing and the dubbing is restarted by returning to the beginning of the track in which the sound skipping has occurred, a data position where the dubbing is restarted and a boundary of digital-audio-signal compression-processes do not match, which causes loss in continuity of the music and the like. Particularly, in the case of a non-stop CD having no blank space between tracks, abnormal noise may be recorded in a linkage portion between tracks (dubbing restarted position). Furthermore, to prevent recording of any abnormal noise in the linkage portion between tracks, it is necessary to restart dubbing from the first track, which causes enormous time to be required for all those dubbing processes.

It is therefore an object of the present invention to provide a digital dubbing device capable of accurately performing a dubbing process over again in a short time when the dubbing process has been interrupted.

Means for Solving Problem

According to claim 1, to overcome the problem mentioned above and to achieve the objects, a digital dubbing device, which compresses a digital signal for each predetermined compression process unit and stores compressed digital signal, comprises: a data count unit that counts minimum-unit data of the digital signal upon compression of the digital signal, and, based on index information on index of program data for the digital signal and based on the number of counts of the minimum-unit data, detects a data stream of a predetermined number of minimum-unit data located in an end part of the compression process unit from the digital signal; a data-stream storage unit that stores detected data stream of the predetermined number of minimum-unit data; a data-stream comparator that detects a data stream corresponding to the data stream of the predetermined number of minimum-unit data from the digital signal when the storing of the digital signal is interrupted; a signal output unit that outputs the digital signal, the index information, and subcode data which is time information for the program data; a frame detector that detects subcode data corresponding to an end part of the program data from the digital signal, as a frame which is a minimum unit of subcode data, based on the index information; a frame storage unit that stores the frame detected by the frame detector as a boundary frame; a frame comparator that detects a frame identical to the boundary frame from the digital signal when the storing of the digital signal is interrupted; and a controller that restarts the compression and storing of the digital signal from data next to the data stream detected by the data stream comparator. The data count unit detects the data stream of the predetermined number of minimum-unit data from program data output after program data corresponding to the boundary frame.

EXPLANATIONS OF LETTERS OR NUMERALS

1 Digital dubbing device
10 CD drive
20 Input-data count unit
21 Sound unit counter
22 Music data counter
30 Music data comparator
40 Subcode detector
50 Data compressor
60 Data storage unit
70 Transfer-data count unit 80 Controller
A to F Sound unit
a to f Frame

BEST MODE(S) FOR CARRYING OUT THE INVENTION

Embodiments of a digital dubbing device according to the present invention are explained with reference to the attached drawings. It is noted that the present invention is not limited to these embodiments. In the following, the overview and feature of the digital dubbing device according to the present invention are explained as an operational mode, and then embodiments of the digital dubbing device are explained.

Operational Mode

In this operational mode, the digital dubbing device compresses and records programs (digital information) of music data or the like output from a digital-signal reproducing device such as a CD (Compact Disc) drive and a DVD (Digital Video (Versatile) Disc) drive, and programs of music data or the like distributed through the Internet or digital broadcasting. If sound skipping occurs or power interruption occurs during dubbing of music data from CD or the like, it is necessary to restart the dubbing process by returning to the beginning of a track where the sound skipping has occurred, or to restart the dubbing process from the beginning.

To restart dubbing from the beginning of the track where the sound skipping has occurred, a track boundary between songs is previously detected during the dubbing, and the dubbing is restarted from the beginning of the track, where the sound skipping has occurred, based on the track boundary.

One approach to detecting a track boundary is to roughly detect an inter-track gap based on subcode data output together with music data from the CD drive. The subcode data is information including the number of pieces of music (track number) corresponding to music data, Index, elapsed track time, and accumulated time from the beginning of the pieces of music. The digital dubbing device detects the track boundary based on these pieces of information.

A music CD, on which, for example, a live concert is recorded, stores a plurality of tracks, but there is no blank space between the tracks. If sound skipping occurs during the dubbing of such a music CD (non-stop CD) and the dubbing process is restarted by returning to the beginning of the track where the sound skipping has occurred, abnormal noise is recorded between the tracks unless the track boundary is accurately detected to restart the dubbing process.

A frame which is a minimum unit of the subcode data includes information on music data for each 13.3 msec or the like. On the other hand, compression is performed for each music data of, for example, 23-msec length as a compression process unit (hereinafter, "sound unit"). Therefore, the boundary between frames and the boundary between music data hardly match each other. Consequently, if a track boundary is detected per frame of 13.3 msec when the music data is compressed in the sound unit of 23 msec, the process cannot be restarted from an accurate position matching the sound unit upon restarting of the dubbing process. This causes abnormal noise to be recorded in a gap between tracks when the non-stop CD is dubbed track by track or when dubbing process is restarted from the beginning of a track in which dubbing process has been interrupted.

The dubbing process is performed in such a manner that compression is performed in the sound unit of a predetermined size and then recording is performed. Therefore, by detecting an inter-track gap using the sound unit, the dubbing process can be restarted from the accurate position, and thus abnormal noise can be prevented from being recorded in a gap between tracks.

In the operational mode, therefore, the track boundary is detected using music data in the sound unit in addition to the frame. For example, during the dubbing process, the frame previous by one to a frame corresponding to the beginning of each track (last frame in the previous track) is stored as a frame representing the track boundary based on index information (TOC (Table Of Contents) in the case of a music CD) for digital signals. Further, the last music data in the sound unit, which includes the music data representing the track boundary based on the frame, is stored for a predetermined number of samples as a music data stream representing the track boundary. Then, when sound skipping or the like occurs, a track boundary between the track where the sound skipping has occurred and a track previous by one to the track is detected based on the frame representing the track boundary stored during dubbing and the music data stream representing the track boundary. Thereby, the dubbing process is restarted from the beginning of the track in which dubbing process has been interrupted.

As described in the operational mode, a frame corresponding to a track boundary and a music data stream in a sound unit corresponding to the track boundary are stored during the dubbing process of digital information such as music data, and the music data stream is set as one representing the track boundary. Therefore, it is possible to restart the dubbing process caused by sound skipping or the like from an accurate position. This allows dubbing of digital information without any abnormal noise recorded in a gap between tracks even if the dubbing process is interrupted in the middle of this process.

FIRST EMBODIMENT

Figure 1:
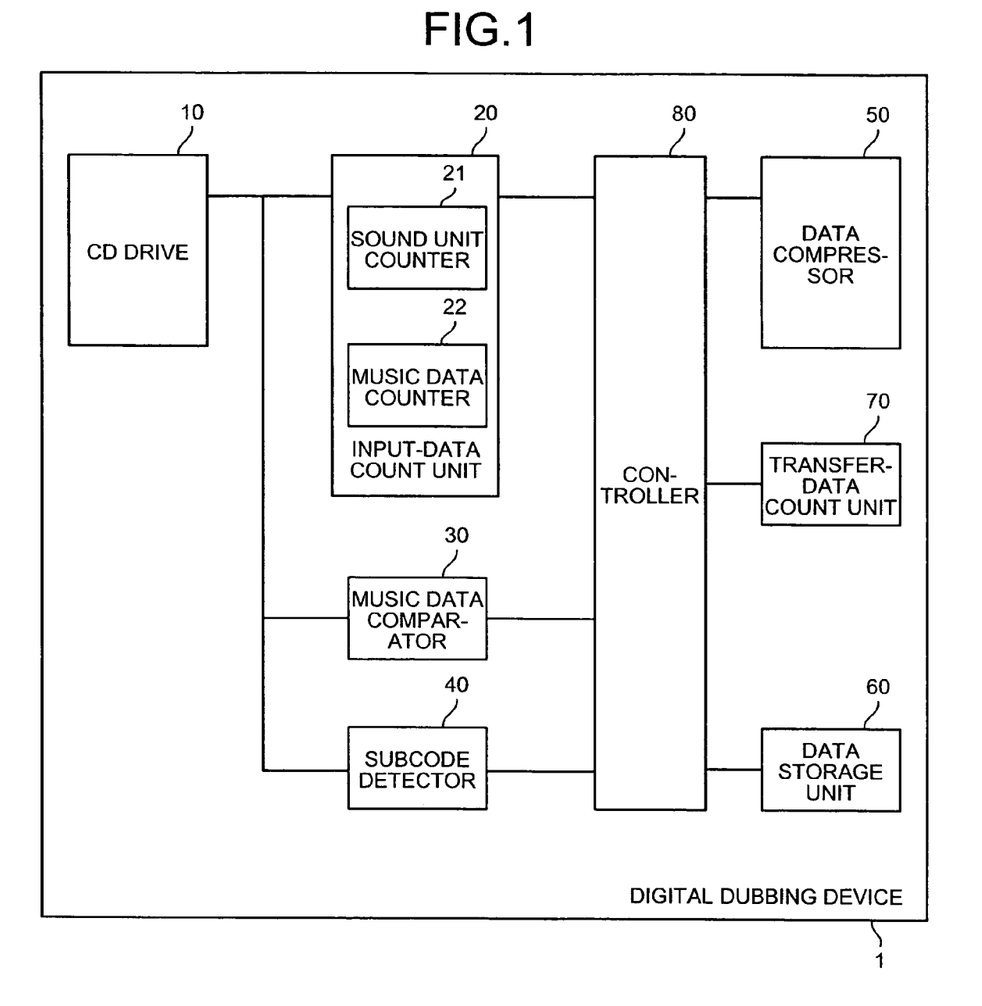
FIG. 1 is a block diagram of a configuration of a digital dubbing device 1 according to a first embodiment.

FIG. 1 is a block diagram of a configuration of a digital dubbing device 1 according to the present invention. The digital dubbing device 1 compresses music data (digital signal) on a music CD or the like and stores it, and includes a CD (Compact Disc) drive 10, an input-data count unit 20, a music data comparator 30, a subcode detector 40, a data compressor 50, a data storage unit 60, a transfer-data count unit 70, and a controller 80.

The CD drive 10 reproduces a music CD or the like, and outputs music data, subcode data, TOC (Table Of Contents) information, and the like. The music data is data on sound such as music, conversation, and audio, and is compressed using the sound unit as compression process unit. The subcode data is information other than the music data in the CD, and is output together with the music data from the CD drive 10. The subcode data is data corresponding to the music data, and includes information such as a music (song) number (Track number), a data number (Index number) to locate the head of each track, elapsed-track-time information, and accumulated elapsed-time information for the whole CD. The subcode data has information such as these Track number and Index number for each frame which is a minimum unit, and is used to detect a track boundary and the like. The TOC information is time information for music data written in a read-in area of the CD. The TOC information includes information (Address, Track, Index), which is recorded in the music CD, for detecting the beginning of each track, elapsed-track-time information (min, sec, frame), and accumulated elapsed-time information (amin, asec, frame) of the whole CD. The TOC information is used here to detect a frame representing a track boundary, and the like.

The subcode detector 40 previously sets a condition to detect a frame which is a head portion of a track (start of a track) based on the TOC information, and detects a frame that satisfies the condition from subcodes (frames) output from the CD drive 10. The frame detected is a frame that corresponds to the beginning of the track, and a frame just before the frame detected is the last frame in the previous track. The subcode detector 40 causes the data storage unit 60 to store a subcode data value of the last frame in the previous track as a frame representing the track boundary.

When the dubbing process is interrupted by sound skipping or the like in the CD drive 10 and restarted, the subcode detector 40 compares the frame representing the track boundary stored in the data storage unit 60 with the subcode data output from the CD drive 10. The subcode detector 40 detects data, corresponding to the frame representing the track boundary, from the subcode data being output from the CD drive 10.

The input-data count unit 20 includes a sound unit counter 21 that counts music data before compression sent from the CD drive 10 in the sound unit, and a music data counter 22 that counts the number of samples of music data in a sound unit. The number of music data contained in the sound unit is previously decided as a predetermined number (number of samples). The sound unit counter 21 is incremented when the predetermined number (the number of samples for one sound unit) of music data previously decided in the sound unit is counted by the music data counter 22. The music data counter 22 counts the number of samples of the music data in the sound unit after the frame representing the track boundary is detected in the subcode detector 40, and detects the end part of the sound unit corresponding to the track boundary. The music data in the end part of the sound unit is stored in the data storage unit 60, by a fixed length of four samples or the like, as a music data stream representing the track boundary.

When the dubbing process having been interrupted is restarted, the music data comparator 30 compares the music data stream representing the track boundary stored in the data storage unit 60 with the music data output from the CD drive 10. Then, the music data comparator 30 detects music data corresponding to the music data stream representing the track boundary from the music data being output from the CD drive 10.

The data compressor 50 compresses the music data output from the CD drive 10 for each sound unit that consists of a predetermined number of music data. The data compressor 50 compresses music data by, for example, an ATRAC3 encoder, an MP3 encoder, and an AAC encoder.

The data storage unit 60 stores the TOC information from the CD drive 10, the frame representing the track boundary detected in the subcode detector 40, the music data stream representing the track boundary detected in the input-data count unit 20, and the music data compressed in the data compressor 50. The data storage unit 60 is formed with, for example, a HDD (Hard Disk Drive), a flash memory, RAM (Random Access Memory), or the like.

The transfer-data count unit 70 counts the number of sound units after compression to be transferred from the data compressor 50 to the data storage unit 60. The controller 80 controls the CD drive 10, the input-data count unit 20, the music data comparator 30, the subcode detector 40, the data compressor 50, the data storage unit 60, and the transfer-data count unit 70.

Figure 2:
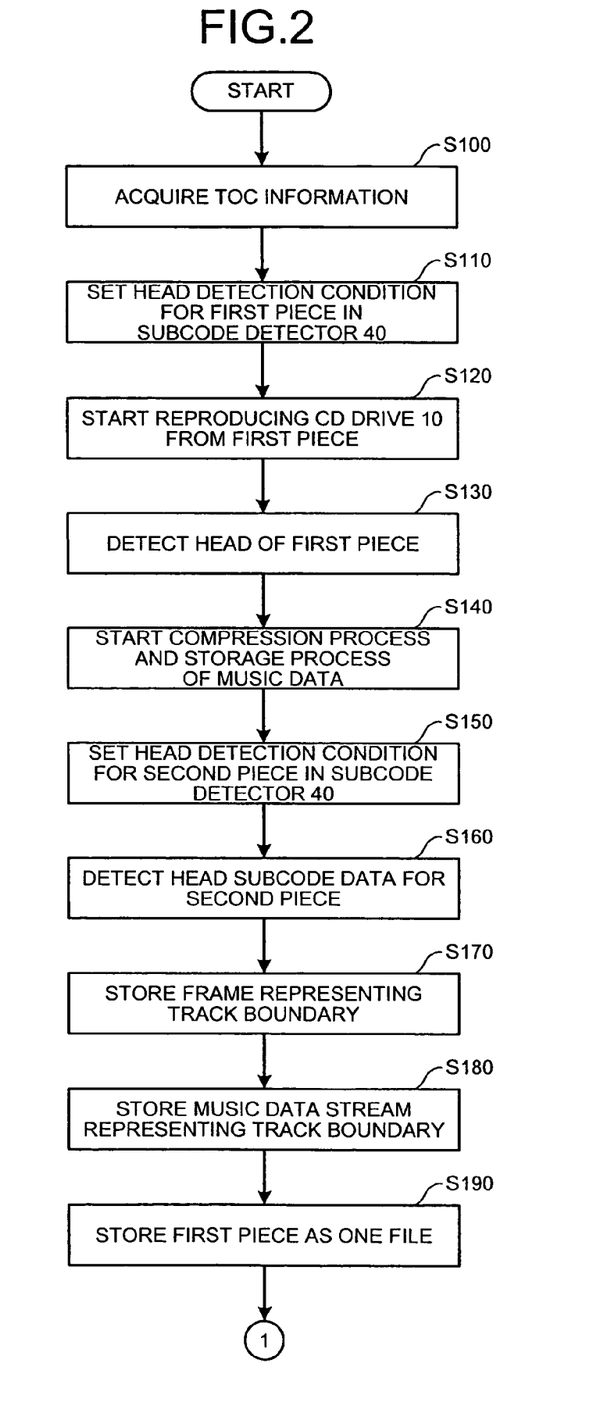
FIG. 2 is a flowchart (1) of an operation procedure for a dubbing process according to the first embodiment.

The operation of each component shown in FIG. 1 is explained in detail below with reference to flowcharts of FIG. 2 and FIG. 4. FIG. 2 is a flowchart (1) of an operation procedure for the dubbing process of music data. In the first embodiment, how to dub a music CD with N (N: natural number of 2 or more) pieces or more of music recorded is explained below.

When the digital dubbing device 1 starts the dubbing process, TOC information for the music CD output from the CD drive 10 is stored in the data storage unit 60 (step S100). The data storage unit 60 sends the subcode detector 40 a detection condition (Address=1, Track=1, Index=1, etc.) for detecting the head of a first piece of music to be played based on the TOC information. The subcode detector 40 sets a head detection condition for the first piece to be played (step S110). When the head detection condition for the first piece to be played is set by the subcode detector 40, the CD drive 10 becomes ready to reproduce, and the music data and the subcode data for the first piece are started to be output from the CD drive 10 (step S120).

Figure 3:
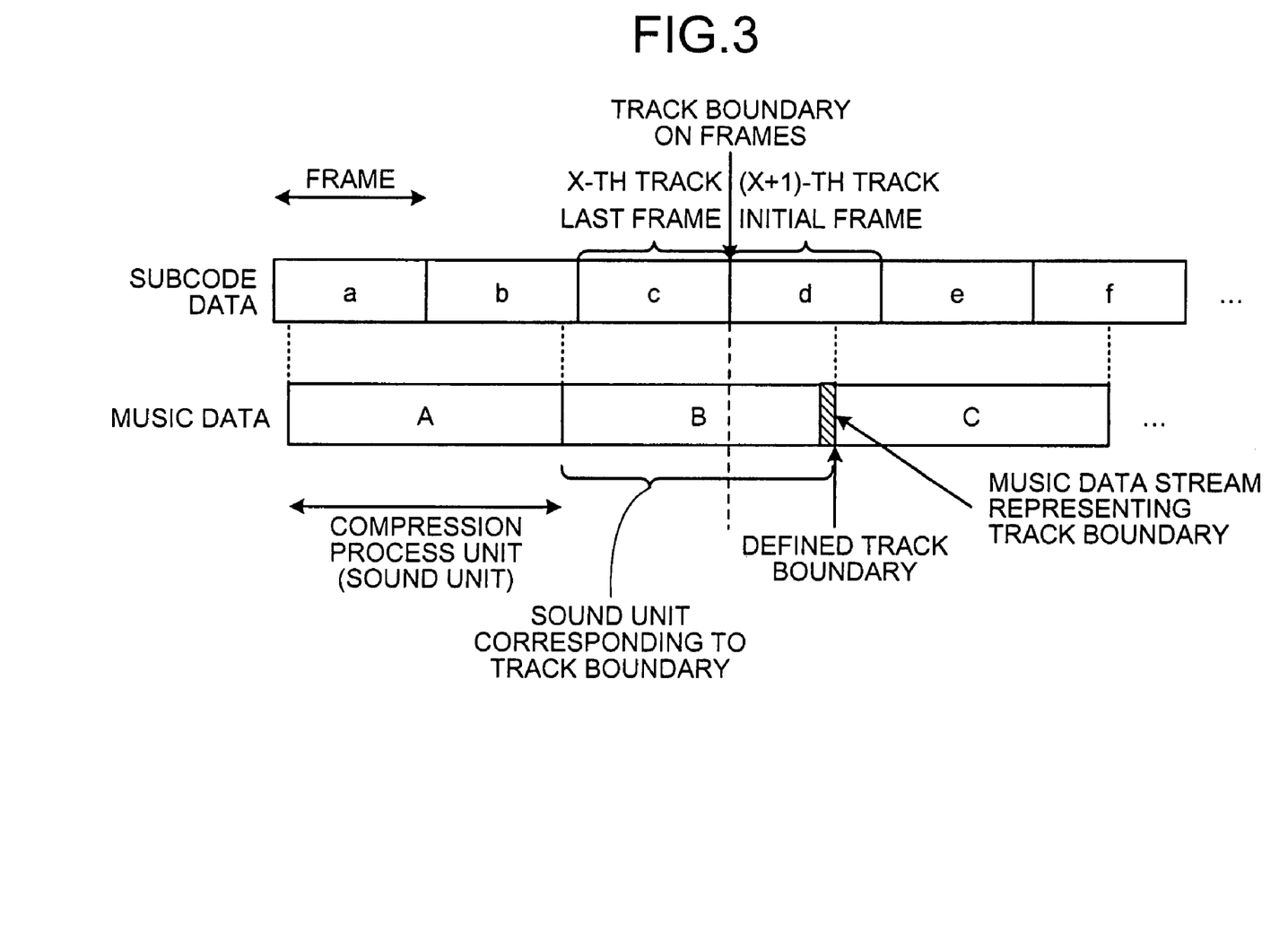
FIG. 3 is a diagram for explaining a frame representing a track boundary and a music data stream representing the track boundary.

FIG. 3 is a diagram for explaining a frame representing a track boundary and a music data stream representing the track boundary. The CD drive 10 outputs the music data and the subcode data in order from one on the left side to one on the right side. In other words, the music data is output from the CD drive 10 as a series of music data in order of sound unit A, sound unit B, and sound unit C. The subcode data is output from the CD drive 10 as a series of subcode data in order of frame a, frame b, frame c, frame d, frame e, and frame f. Besides, the subcode data has time information for the music data, and subcode data corresponding to each music data is output concurrently with the music data.

The music data and the subcode data are continuously output from the CD drive 10. However, the music data is recognized in the input-data count unit 20 and the data compressor 50 for each sound unit as compression process unit, while the subcode data is recognized in the subcode detector 40 for each frame. The subcode data has time information for the music data, and subcode data corresponding to each piece of music data is concurrently output concurrently with the music data.

The length of a frame is different from the length of a sound unit, and, accordingly, a boundary between frames and a boundary between sound units hardly match each other. Therefore, even if the subcode data corresponds to the music data, this does not mean that there is a one-to-one correspondence between frames and sound units. In addition, the actual track boundary does not always match the boundary of the sound units. Here, there is shown the case where an actual track boundary is in the sound unit B.

The subcode detector 40 sets a track boundary on frames based on the TOC information. Here, the actual track boundary is in the sound unit B, and it can be seen that the frame c is the last frame in an X-th track and the frame d is the initial frame in an (X+1)-th track based on the TOC information. Therefore, the boundary between the frame c and the frame d is set as a track boundary on frames. The sound unit B is a sound unit corresponding to the track boundary on frames, and the music data stream located in the end part of the sound unit B is defined as a music data stream representing the track boundary.

Then, the subcode detector 40 detects a frame matching the head condition for a first piece of music to be played from the subcode data sent from the CD drive 10 (step S130). When the subcode data that matches the head condition for the first piece is detected, the sound unit counter 21, the music data counter 22, and the transfer-data count unit 70 are initialized.

The music data output from the CD drive 10 is sent to the input-data count unit 20 and the data compressor 50. The input-data count unit 20 counts the number of sound units before being compressed. The data compressor 50 compresses the music data for each sound unit and sends the music data compressed to the data storage unit 60 (step S140). At this time, the transfer-data count unit 70 counts the number of sound units to be sent from the data compressor 50 to the data storage unit 60.

The data storage unit 60 checks whether there is a second track in the music data from the TOC information. Here, the music data has the second track, and the data storage unit 60 sends the subcode detector 40 a detection condition (Address=1, Track=2, Index=1, etc.) for detecting the head of a second piece of music to be played based on the TOC information. The subcode detector 40 sets a head detection condition for the second piece to be played (step S150).

The detection of the head portion of the second piece to be played is started slightly before the second piece is played. A detection start position of the second piece to be played is determined based on a playing time for the first track obtained from the TOC information and the number of sound units counted by the sound unit counter 21 and by the transfer-data count unit 70. For example, when detection of the second piece to be played is started from three frames before the second track is programmed to be started, a time obtained by subtracting a reproduction time corresponding to three frames from the playing time for the first track is set as a detection start time of the second track.

When the second piece of music as the second track (music data and subcode data) is output subsequent to the first track from the CD drive 10, the subcode detector 40 detects a frame, which matches the head condition for the second piece to be played, from the subcode data sent from the CD drive 10 (step S160). Then, a notification, indicating that the frame matching the head condition for the second piece to be played (track boundary on frames) has been detected, is sent from the subcode detector 40 to the music data counter 22.

The music data counter 22 counts the number of music data, and calculates how many pieces of remaining music data should be counted to reach a boundary of the next sound unit. The calculation is based on the total number of the music data counted when the notification, indicating that the track boundary on frames has been detected, is received from the subcode detector 40 and the number of the music data forming one sound unit.

Based on the calculation result, the music data counter 22 detects a music data stream of, for example, four samples located in the end part of a sound unit before compression, the sound unit being located on the boundary (track boundary on frames) between the last frame in the first track and the initial frame in the second track.

The data storage unit 60 receives from the subcode detector 40 the frame (the last frame in the first track) just before the frame corresponding to the beginning of the second track detected by the subcode detector 40, and stores the frame received as a frame representing the track boundary between the first track and the second track (step S170). The data storage unit 60 receives the music data stream of the four samples detected by the music data counter 22 therefrom, and stores it as a music data stream representing the track boundary between the first track and the second track (step S180).

The sound unit counter 21 informs the transfer-data count unit 70 of the total number of sound units before compression counted as the first track when the frame corresponding to the beginning of the second track is detected. The transfer-data count unit 70 calculates a difference between the total number of sound units before compression sent from the sound unit counter 21 and the total number of sound units after compression (counted by the transfer-data count unit 70) transferred from the data compressor 50 to the data storage unit 60 until then. The transfer-data count unit 70 sends a notification indicating that the data transfer for the first track has been completed to the data storage unit 60 when a sound unit as the difference is transferred from the data compressor 50 to the data storage unit 60.

Here, the track boundary of a piece of music transferred to the data storage unit 60 is recognized based on the total number of the sound units counted by the transfer-data count unit 70 and the total number of the sound units counted by the sound unit counter 21. It is thereby possible to recognize an accurate track boundary even if the compression is delayed in the data compressor 50.

When receiving the notification indicating the completion of the data transfer for the first track, the data storage unit 60 stores the piece being the first track as one file (step S190), and ends the dubbing process for the first track.

Figure 4:
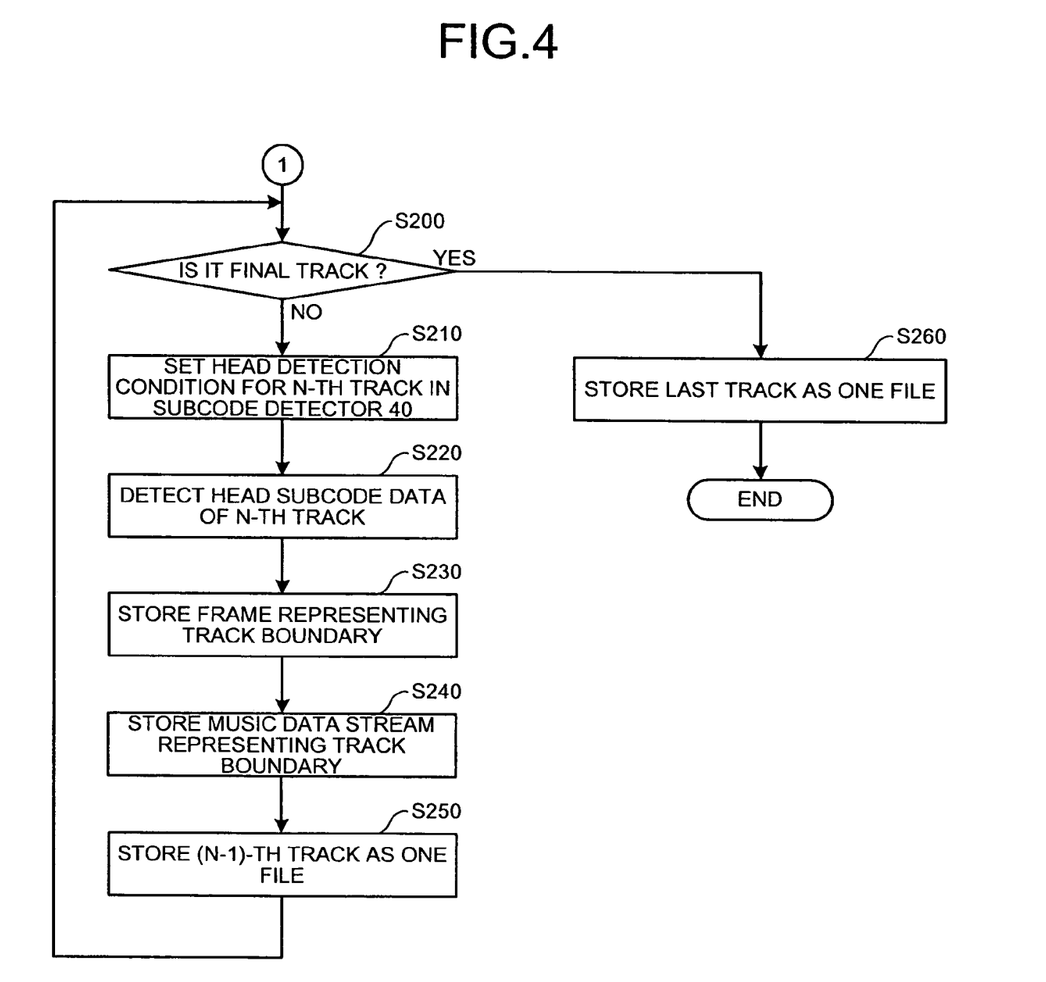
FIG. 4 is a flowchart (2) of the operation procedure for the dubbing process according to the first embodiment.

FIG. 4 is a flowchart (2) of the operation procedure for the dubbing process for music data. How to dub a piece of music (N-th track) after the second track and thereafter is explained below. When a music CD where sound skipping has occurred is taken out of the CD drive 10 before the dubbing process is restarted after occurrence of the sound skipping, the TOC information is read again from the music CD upon restart of the dubbing process.

The input-data count unit 20 counts the number of sound units before being compressed in the same manner as that of the first track while pieces of music after the second track are output from the CD drive 10. The data compressor 50 compresses the music data for each sound unit, and sends the data compressed to the data storage unit 60. At this time, the transfer-data count unit 70 counts the number of sound units sent from the data compressor 50 to the data storage unit 60.

The data storage unit 60 checks whether the next piece of music output from the CD drive 10 is the last piece (final piece) based on the TOC information (step S200). If the piece from the CD drive 10 is not the last one (if N is a natural number of 3 or more) (No at step S200), then the data storage unit 60 dubs the music CD by the same process as for the first track. In other words, the data storage unit 60 sends the subcode detector 40 a detection condition (Address=1, Track=N, Index=1, etc.) for detecting the head of a piece of music (N-th track) to be played next based on the TOC information. The subcode detector 40 sets a head detection condition for an N-th piece to be played (step S210).

The subcode detector 40 starts detection of subcode data, which matches the head detection condition for the N-th piece to be played, from slightly before the N-th track is started. When the N-th track is output subsequent to an (N−1)-th track from the CD drive 10, the subcode detector 40 detects a frame that matches the head detection condition for the N-th piece to be played from the subcode data sent from the CD drive 10 (step S220). A frame at this time is detected based on Address, Track, and Index of a plurality of subcode data which are present in a track to avoid erroneous detection.

The music data counter 22 detects the last music data stream of four samples in the sound unit corresponding to a boundary (track boundary on frames) between the last frame in the (N−1)-th track and the initial frame in the N-th track.

The data storage unit 60 receives from the subcode detector 40 the frame (the last frame in the (N−1)-th track) just before the frame corresponding to the beginning of the N-th track detected by the subcode detector 40, and stores the frame received as a frame representing the track boundary between the (N−1)-th track and the N-th track (step S230). The data storage unit 60 receives from the music data counter 22 the music data stream of the four samples detected by the music data counter 22, and stores it as the music data stream representing the track boundary between the (N−1)-th track and the N-th track (step S240).

When detecting the frame corresponding to the beginning of the N-th track, the sound unit counter 21 informs the transfer-data count unit 70 of the total number of sound units before compression counted as the (N−1)-th track. The transfer-data count unit 70 calculates a difference between the total number of sound units before compression sent from the sound unit counter 21 and the total number of sound units after compression transferred from the data compressor 50 to the data storage unit 60 until then. The transfer-data count unit 70 sends a notification indicating that the data transfer for the (N−1)-th track has been completed to the data storage unit 60 when a sound unit as the difference is transferred from the data compressor 50 to the data storage unit 60. When receiving the notification indicating the completion of the data transfer for the (N−1)-th track, the data storage unit 60 stores a piece of music being the (N−1)-th track as one file (step S250). Hereinafter, steps S200 to S250 are repeated until it is determined at step S200 that the piece from the CD drive 10 is the last one.

On the other hand, when the piece from the CD drive 10 is the last one (Yes at step S200), the subcode detector 40 does not set a head detection condition for an (N+1)-th piece of music to be played. When the piece as the N-th track is the last one, the sound unit counter 21 cannot detect a frame corresponding to the beginning of an (N+1)-th track. Therefore, when it is determined that the frame corresponding to the beginning of the (N+1)-th track cannot be detected for a predetermined time, the sound unit counter 21 informs the transfer-data count unit 70 of the total number of sound units before compression counted until the N-th track. The transfer-data count unit 70 calculates a difference between the total number of sound units before compression sent from the sound unit counter 21 and the total number of sound units after compression transferred from the data compressor 50 to the data storage unit 60 until then. The transfer-data count unit 70 sends a notification indicating that the data transfer for the N-th track has been completed to the data storage unit 60 when a sound unit as the difference is transferred from the data compressor 50 to the data storage unit 60.

When receiving the notification indicating the completion of the data transfer for the N-th track from the transfer-data count unit 70, the data storage unit 60 stores the piece being the N-th track (final track) as one file (step S260), stops the CD drive 10, and ends the dubbing process of the music CD.

If no sound skipping occurs in the music data output from the CD drive 10, all the music data on the music CD can be stored in the data storage unit 60. If sound skipping occurs in the music data output from the CD drive 10, it is necessary to stop dubbing a piece of music where the sound skipping has occurred and restart the dubbing process from the piece where the sound skipping has occurred.

When sound skipping occurs in the music data output from the CD drive 10, information indicating occurrence of sound skipping is output from the CD drive 10, and after all the music data before occurrence of the sound skipping is compressed in the sound unit and stored, the digital dubbing device 1 is caused to interrupt the dubbing process. At this time, the data storage unit 60 already stores the frame representing the track boundary between a piece as an L-th (L is a natural number of 2 or more) track where the dubbing process is interrupted (hereinafter, "interrupted track") and a piece ((L−1)-th track) just before the interrupted track. The data storage unit 60 also stores the music data stream representing the track boundary. Therefore, the frame representing the track boundary is set as a frame for restarting dubbing of the interrupted track and the music data stream representing the track boundary is set as a music data stream for restarting dubbing of the interrupted track. The data storage unit 60 deletes the music data (sound unit after compression) for the interrupted track stored before the dubbing process is interrupted. After the interruption of the dubbing process, the digital dubbing device 1 restarts the dubbing process from the beginning of the interrupted track.

Figure 5:
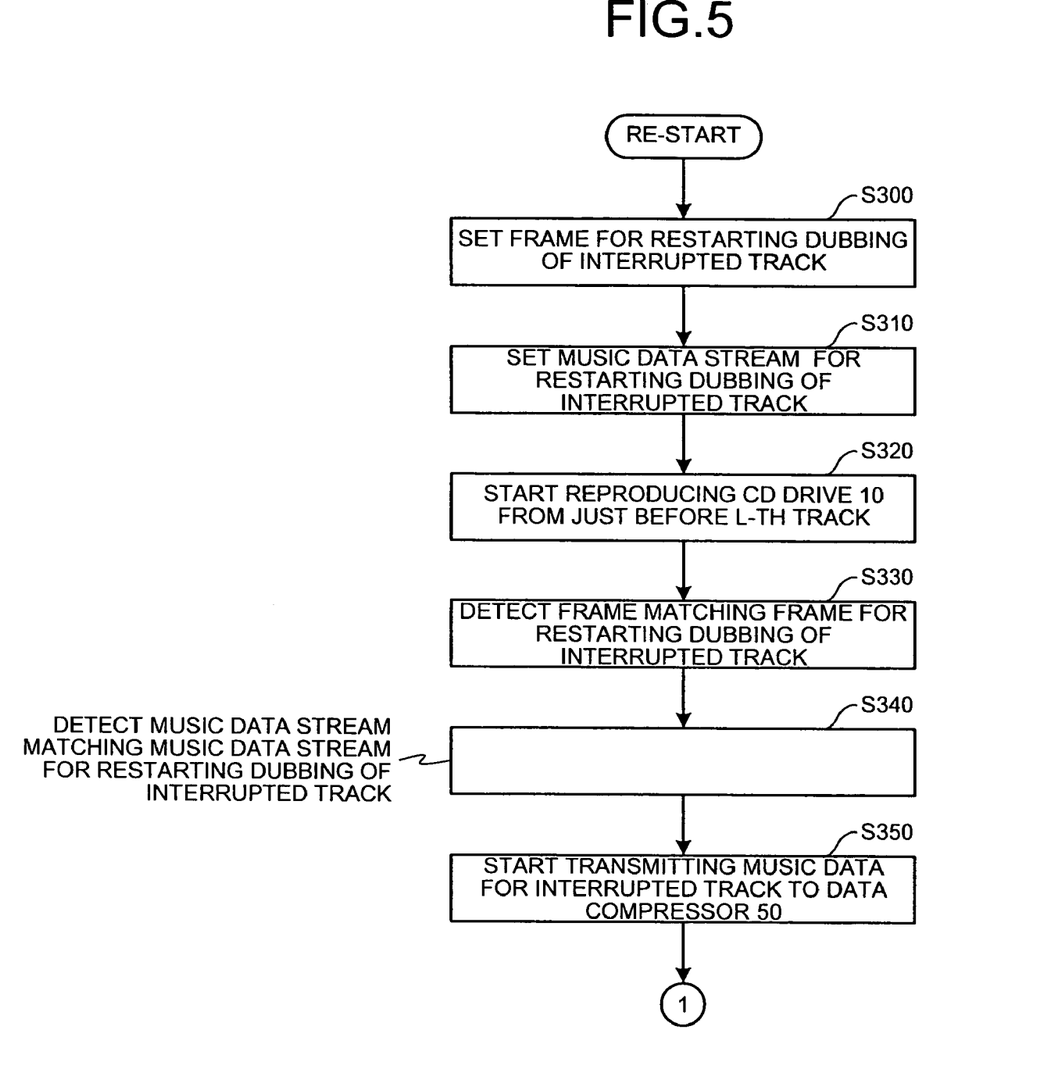
FIG. 5 is a flowchart of an operation procedure for restarting the dubbing according to the first embodiment.

FIG. 5 is a flowchart of an operation procedure for restarting the dubbing according to the first embodiment. The data storage unit 60 sends the frame for restarting dubbing of the interrupted track stored to the subcode detector 40, and sends the music data stream for restarting dubbing of the interrupted track to the music data comparator 30.

The subcode detector 40 sets the frame for restarting dubbing of the interrupted track as a head detection condition for the interrupted track (step S300). The music data comparator 30 sets the music data stream for restarting dubbing of the interrupted track as the head detection condition for the interrupted track (step S310). Further, the data storage unit 60 sends instruction information to the CD drive 10 to reproduce the music CD from a frame a predetermined number of frames before the frame for restarting dubbing of the interrupted track (slightly before the L-th track).

The CD drive 10 reproduces the music CD from the frame a predetermined number of frames before the interrupted track, and starts an output of the music data and the subcode data (step S320). The subcode detector 40 starts detection of the subcode data output from the CD drive 10.

The subcode detector 40 detects a frame that matches the frame for restarting dubbing of the interrupted track from the subcode data output from the CD drive 10 (step S330). At this time, the frame is detected based on time information (amin, asec, aframe) for the subcode data to specify the precise position of the frame. When the frame that matches the frame for restarting dubbing of the interrupted track is detected, a notification indicating that the frame for restarting dubbing of the interrupted track has been detected is sent from the subcode detector 40 to the music data comparator 30.

When receiving the notification indicating the detection of the frame for restarting dubbing of the interrupted track from the subcode detector 40, the music data comparator 30 starts detection of the music data output from the CD drive 10. To prevent erroneous detection of a frame, it is set so that detection of music data is performed within a predetermined number of frames. If the detection is not successful, the detection process of music data is repeated within the predetermined number of frames.

When the music data comparator 30 detects the music data stream for restarting dubbing of the interrupted track from the music data sent from the CD drive 10 (step S340), the input-data count unit 20 and the transfer-data count unit 70 are initialized. The sound unit to be output next to the music data stream for restarting dubbing of the interrupted track is started to be transmitted, as music data for the beginning of the interrupted track, to the data compressor 50 (step S350).

As explained above, because the dubbing process is restarted based on the frame for restarting dubbing of the interrupted track and the music data stream for restarting dubbing of the interrupted track, the music data for the beginning of the interrupted track follows music data (music data stream representing the track boundary) which corresponds to the end part of the music data of the track just before the interrupted track. In other words, the continuity of the music data in the track boundary when the dubbing process is restarted after being interrupted coincides with the continuity of the music data in the track boundary when the dubbing process is not interrupted.

Hereinafter, the process is returned to step S200 shown in the flowchart of FIG. 4 and the dubbing process is continued. More specifically, the data storage unit 60 checks whether the next piece of music output from the CD drive 10 is the last piece (final piece) based on the TOC information (step S200).

When the piece output from the CD drive 10 is not the last one (step S200, No), the subcode detector 40 sets a head detection condition for an (L+1)-th piece of music to be played as an (L+1)-th track (step S210). The subcode detector 40 detects subcode data that matches the head detection condition for the (L+1)-th piece to be played from the subcode data sent from the CD drive 10 (step S220). The music data counter 22 detects a music data stream representing the track boundary between the L-th track and the (L+1)-th track.

The data storage unit 60 stores the frame representing the track boundary between the L-th track and the (L+1)-th track and the music data stream representing the track boundary (steps S230, S240). When receiving a notification indicating the completion of data transfer for the L-th track from the transfer-data count unit 70, the data storage unit 60 stores a piece of music being the L-th track as one file (step S250). Thereafter, steps S200 to S250 are repeated until it is determined at step S200 that a piece of music sent from the CD drive 10 is the last one.

On the other hand, when the piece output from the CD drive 10 is the last one (Yes at step S200), the subcode detector 40 does not set the head detection condition for the (L+1)-th piece to be played.

After the last sound unit in the L-th track is transferred from the data compressor 50 to the data storage unit 60, the data storage unit 60 stores the piece being the L-th track (final track) as one file (step S260), stops the CD drive 10, and ends the dubbing process of the music CD.

Besides, if sound skipping occurs in the CD drive 10 and the dubbing process is interrupted during steps S200 to S260, the process returns to step S300 to repeat the restart of the dubbing process.

The music data stream sent from the music data counter 22 to be stored in the data storage unit 60 is not limited to a data stream of four samples. An arbitrary number of samples of the music data can be detected in the music data counter 22 and stored in the data storage unit 60. By increasing the number of samples of the music data to be stored in the data storage unit 60, erroneous detection of the music data from the CD drive 10 can be reduced upon restarting of the dubbing process. Furthermore, by reducing the number of samples of the music data to be stored in the data storage unit 60, effects due to scratches or dirt on the music CD can be reduced.

In the first embodiment, how to perform the dubbing process of the music data while the sound unit is filed for each track in the data storage unit 60 is explained, but the sound unit can be filed for each track after all the sound units are stored in the data storage unit 60.

Additionally, in the first embodiment, the frame representing the track boundary and the music data stream representing the track boundary are detected to restart the dubbing process, but the dubbing process can be restarted only by detecting the music data stream. In this case, the sound unit containing the track boundary is detected based on the TOC information and the number of music data counted by the music data counter 22, and the music data stream representing the track boundary is detected by counting the number of music data in the sound unit.

In the first embodiment, the dubbing process is restarted from the track where the dubbing process is interrupted. However, if the music data stream is failed to be detected upon restarting of the dubbing process, the restart process can also be performed from a track just before the interrupted track. In this case, the CD drive 10 reproduces the music CD from a frame a predetermined number of frames before a track boundary of the track just before the interrupted track, and outputs the music data and the subcode data. The subcode detector 40 detects the subcode data output from the CD drive 10.

In the first embodiment, the digital dubbing device 1 includes the CD drive 10, but the digital dubbing device 1 and the CD drive 10 can be separately configured. Further, in the first embodiment, the music data is output from the CD drive 10, but the data output from the CD drive 10 is not limited to the music data, and can therefore include video data.

According to the first embodiment, when the dubbing process is performed on the music CD, the subcode data representing the track boundary and the music data stream representing the track boundary are previously stored. Therefore, the continuity of the music data in the track boundary when the dubbing process is restarted after being interrupted can be made identical to the continuity of the music data in the track boundary when the dubbing process is not interrupted. Therefore, even if the dubbing process is interrupted, the music CD can be dubbed without abnormal noise entering a track boundary portion. Moreover, because the dubbing process can be restarted from the beginning of the interrupted track, there is no need to restart the dubbing process from the first track on the music CD, which allows reduction in the time for performing the dubbing process over again.

SECOND EMBODIMENT

A second embodiment of the present invention is explained below with reference to FIG. 1 and FIGS. 6 to 8. In the second embodiment, music data streams in the end parts of all the sound units are previously stored. When a dubbing process is interrupted and then restarted, music data, which matches a music data stream stored right before the interruption occurs, is detected from the music data output from the CD drive 10 to restart the dubbing process from music data following the music data detected.

Figure 6:
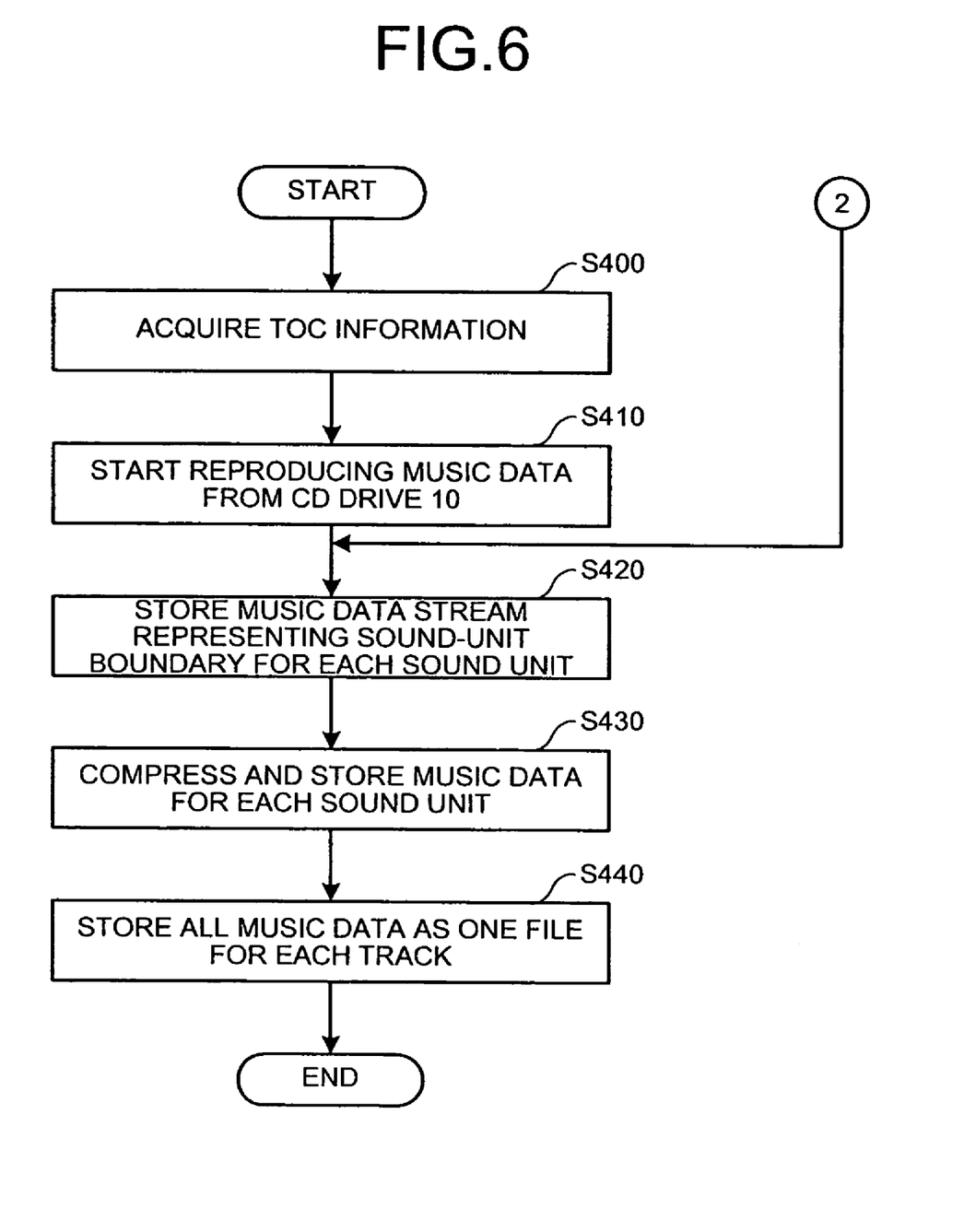
FIG. 6 is a flowchart of an operation procedure for a dubbing process according to a second embodiment.

FIG. 6 is a flowchart of an operation procedure for the dubbing process according to the second embodiment. When the digital dubbing device 1 starts the dubbing process, TOC information for a music CD output from the CD drive 10 is stored in the data storage unit 60 (step S400).

The data storage unit 60 sends a detection condition to detect the head of a first piece of music to be played based on the TOC information to the subcode detector 40, and the subcode detector 40 sets a head detection condition for the first piece to be played. When the subcode detector 40 has set the head detection condition for the first piece to be played, the CD drive 10 is in a reproduction state to detect the head of the music data output from the CD drive 10, and the music data and subcode data for the first piece are started to be output from the CD drive 10 (step S410).

The subcode detector 40 detects subcode data that matches the head detection condition for the first piece to be played from the subcode data sent from the CD drive 10. When the subcode data matching the head detection condition for the first piece is detected, the sound unit counter 21, the music data counter 22, and the transfer-data count unit 70 are initialized. The music data is continuously output from the CD drive 10 from the first piece to the last piece.

The music data output from the CD drive 10 is sent to the input-data count unit 20 and the data compressor 50. The sound unit counter 21 of the input-data count unit 20 identifies music data from the CD drive 10 for each sound unit before compression, and counts the number of the sound units. The music data counter 22 of the input-data count unit 20 counts the number of samples in the music data to thereby detect a music data stream representing a boundary portion between adjacent sound units. As music data representing the boundary portion between the sound units, a music data stream of, for example, four samples is detected, which is located in the end part of each sound unit irrespective of track boundaries. The music data stream in each sound unit detected is stored in the data storage unit 60 as a music data stream representing a sound-unit boundary (step S420).

Figure 7:
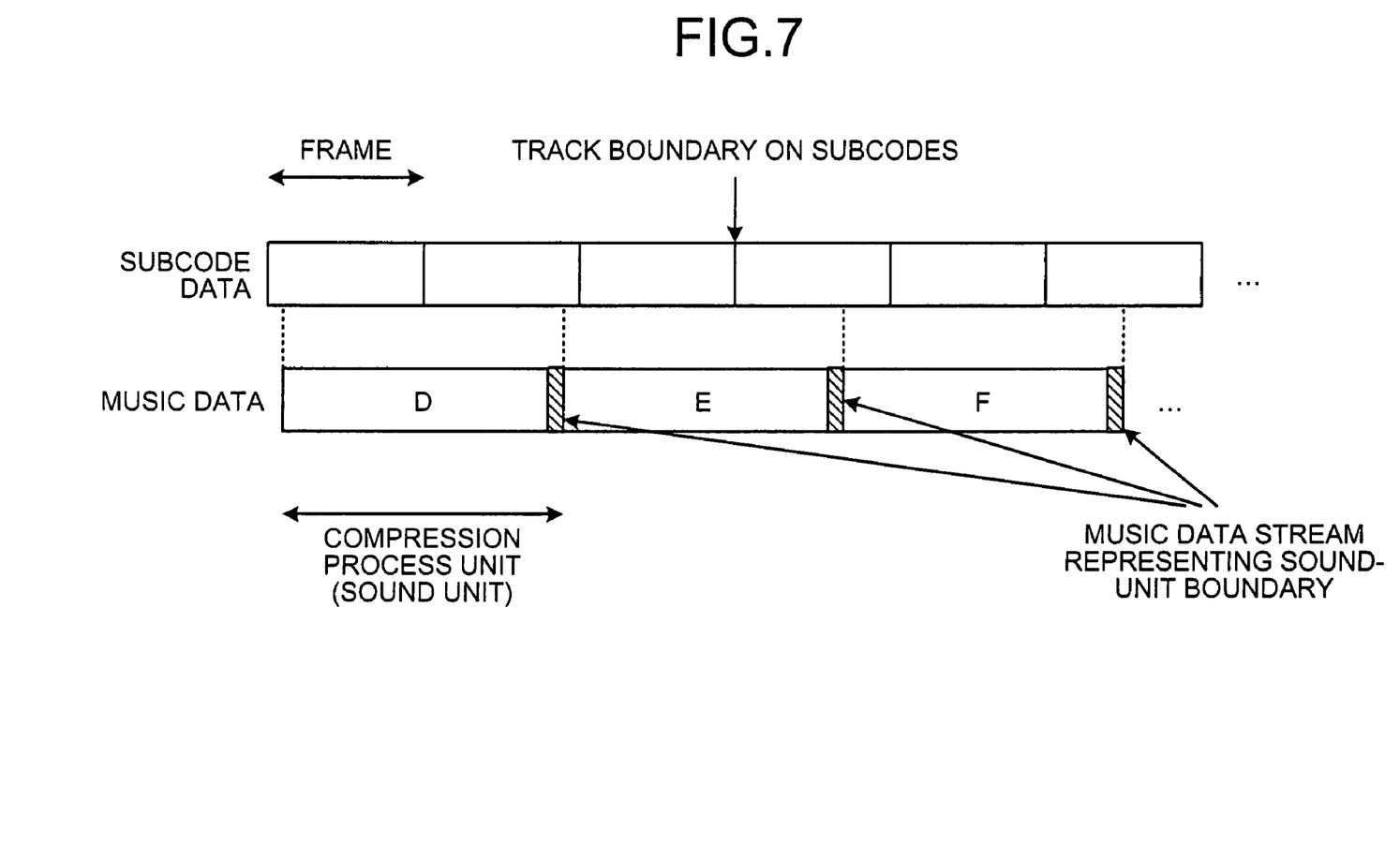
FIG. 7 is a diagram for explaining a music data stream representing a sound-unit boundary.

FIG. 7 is a diagram for explaining a music data stream representing a sound-unit boundary. The CD drive 10 outputs music data in order from one located on the left side to one located on the right side. In other words, the music data is output from the CD drive 10 as a series of music data in order of sound unit D, sound unit E, and sound unit F.

The music data is continuously output from the CD drive 10, and is recognized for each sound unit being compression process unit in the input-data count unit 20 and the data compressor 50. Here, each music data stream located in the end part of each of all the sound units D, E, and F is determined as a music data stream representing the sound-unit boundary irrespective of track boundaries on subcodes.

Next, the data compressor 50 compresses the music data for each sound unit, and sends the data compressed to the data storage unit 60 (step S430). The data storage unit 60 stores the music data, being compressed for each sound unit, as one file for each track (step S440). A track boundary between tracks is calculated based on the TOC information and the number of sound units. Because a playing time required for one sound unit is fixed, by calculating a time which indicates a track boundary based on the TOC information, it is found which sound unit corresponds to the track boundary. Each track boundary between pieces of music is set so as to match a sound-unit boundary. When the track boundary calculated from the TOC information does not match the sound-unit boundary, a sound-unit boundary located right after the track boundary calculated from the TOC information is set as a track boundary.

The music data output from the CD drive 10 is continuously sent to the input-data count unit 20 and the data compressor 50 irrespective of boundaries between tracks, and a music data stream representing the track boundary and a sound unit after compression are stored in the data storage unit 60. When music data for all the pieces are output from the CD drive 10, and when music data streams representing all the track boundaries and all the sound units after compression are stored in the data storage unit 60, the CD drive 10 is stopped, and the dubbing process of the music CD is ended.

If there is no sound skipping in the music data output from the CD drive 10, all the music data on the music CD can be stored in the data storage unit 60. If there is sound skipping in the music data output from the CD drive 10, it is necessary to stop dubbing of a piece of music in which sound skipping has occurred and restart the dubbing process from the position (sound unit) where the sound skipping has occurred.

If there is sound skipping in the music data output from the CD drive 10, information indicating occurrence of sound skipping is output from the CD drive 10, and the digital dubbing device 1 is caused to interrupt the dubbing process.

Figure 8:
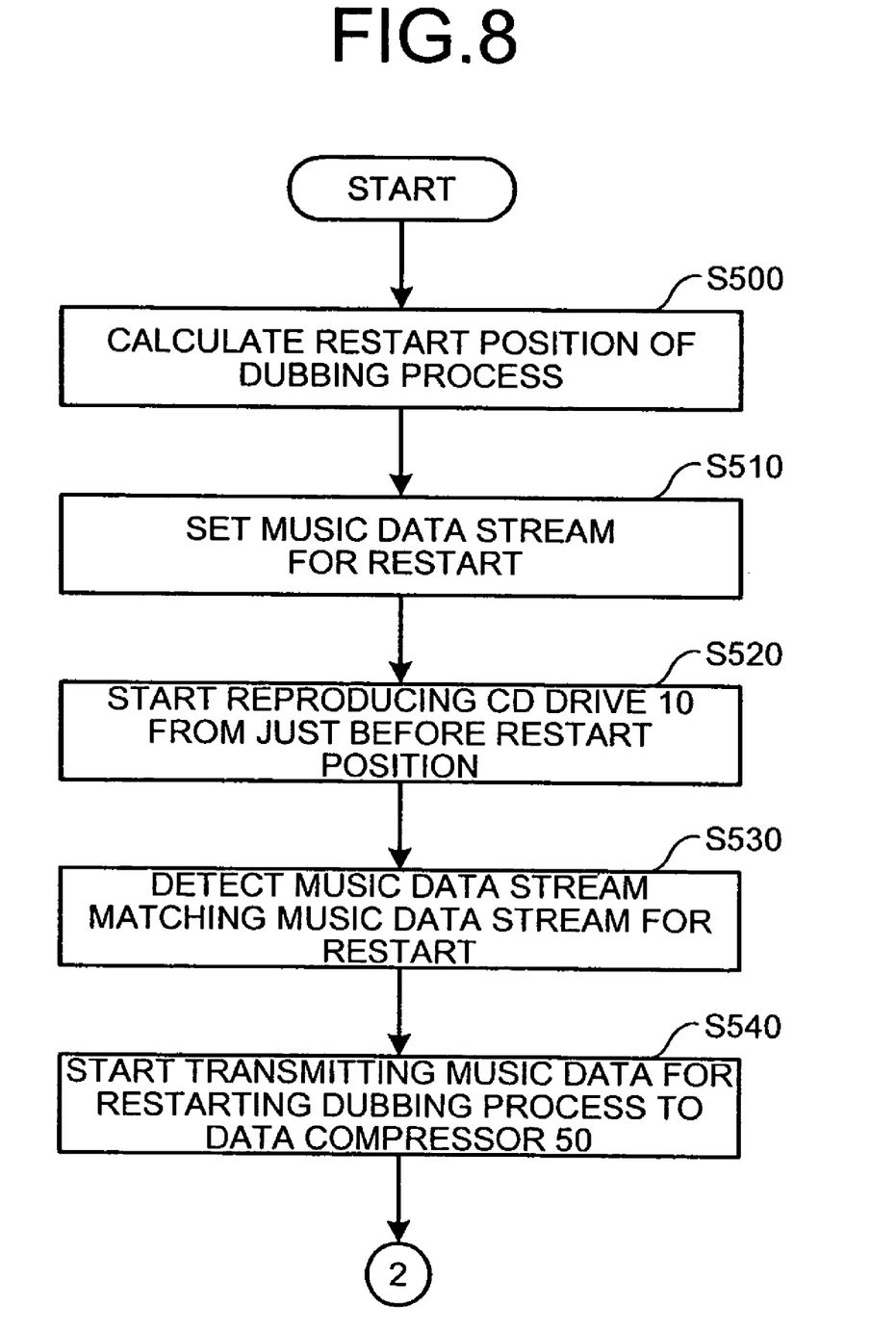
FIG. 8 is a flowchart of an operation procedure for restarting the dubbing according to the second embodiment.

FIG. 8 is a flowchart of an operation procedure for restarting the dubbing process according to the second embodiment.

The transfer-data count unit 70 calculates a time (time for storing music data) during which the dubbing process is performed until interruption occurs, from the total number of sound units or from the total number of music data streams representing sound-unit boundaries stored in the data storage unit by the time the dubbing process is interrupted. Then, the restart position (time) of the dubbing process is calculated based on the result of calculation (step S500).

The data storage unit 60 sends a music data stream (right before the dubbing process is interrupted) to the input-data count unit 20 as a music data stream for restart, the music data stream representing a sound-unit boundary last stored among the stored music data streams representing sound-unit boundaries. The input-data count unit 20 sets the music data stream for restart as a condition to detect the restart position of the dubbing process (step S510).

Further, the data storage unit 60 instructs the CD drive 10 to perform reproduction from music data (from (latest) sound unit a predetermined number of frames before the dubbing restart position) slightly before the restart position of the dubbing process. The CD drive 10 reproduces the music CD from music data slightly before the restart position of the dubbing process, and starts outputting the music data (step S520). At this time, the input-data count unit 20 starts detection from the music data ((latest) sound unit the predetermined number of frames before the dubbing restart position) output from the CD drive 10.

The input-data count unit 20 detects music data that matches the music data stream for restart from the music data output from the CD drive 10 (step S530). When detecting the music data that matches the music data stream for restart, the input-data count unit 20 starts transmitting a sound unit next to the sound unit containing the music data to the data compressor 50, as head music data for restarting the dubbing process (step S540).

Referring back to step S420 as shown in the flowchart of FIG. 6, the dubbing process is continued. That is, the music data counter 22 detects a music data stream located in the end part of each sound unit and stores the music data stream in the data storage unit 60 for each sound unit as a music data stream representing a sound-unit boundary (step S420).

The data compressor 50 compresses music data for each sound unit and sends the music data compressed to the data storage unit 60 (step S430). The data storage unit 60 stores the music data compressed for each sound unit as one file for each track (step S440). When the music data for all the pieces are output from the CD drive 10, and when music data streams representing all the track boundaries and all the sound units after compression are stored in the data storage unit 60, the CD drive 10 is stopped and the dubbing process of the music CD is ended.

If sound skipping occurs in the CD drive 10 and the dubbing process is stopped during steps S420 to S440, the process returns to step S500, where the process of restarting the dubbing process is repeated.

It is noted that the music data stream representing the track boundary is not necessarily detected from all the sound units and stored in the data storage unit 60. The music data stream can be detected and stored at a ratio of one to a predetermined number of sound units.

As described above, according to the second embodiment, when dubbing is to be performed on a music CD, music data streams corresponding to the respective end parts of all sound units or a music data stream corresponding to the end part of one of a predetermined number of sound units is stored irrespective of track boundaries. Therefore, even if the dubbing process is interrupted, there is no need to restart the dubbing process from the beginning of the interrupted track. This allows restarting of the dubbing process from any part of the track, and reduction in the time for performing the dubbing process over again.

The invention claimed is:

1. A digital dubbing device that compresses a digital signal for each predetermined compression process unit and stores compressed digital signal, the digital dubbing device comprising:
   a data count unit that counts minimum-unit data of the digital signal upon compression of the digital signal, and, based on index information on index of program data for the digital signal and the number of counts of the minimum-unit data, detects a data stream of a predetermined number of minimum-unit data located in an end part of the compression process unit from the digital signal;
   a data-stream storage unit that stores detected data stream of the predetermined number of minimum-unit data;
   a data-stream comparator that detects a data stream corresponding to the data stream of the predetermined number of minimum-unit data from the digital signal when the storing of the digital signal is interrupted;
   a signal output unit that outputs the digital signal, the index information, and subcode data which is time information for the program data;
   a frame detector that detects subcode data corresponding to an end part of the program data from the digital signal, as a frame which is a minimum unit of subcode data, based on the index information;
   a frame storage unit that stores the frame detected by the frame detector as a boundary frame;
   a frame comparator that detects a frame identical to the boundary frame from the digital signal when the storing of the digital signal is interrupted; and
   a controller that restarts the compression and storing of the digital signal from data next to the data stream detected by the data stream comparator, wherein
   the data count unit detects the data stream of the predetermined number of minimum-unit data from program data output after program data corresponding to the boundary frame.

2. The digital dubbing device according to claim 1, wherein the data count unit detects the data stream of the predetermined number of minimum-unit data from all of compression process units.

3. The digital dubbing device according to claim 1, wherein the data count unit detects the data stream of the predetermined number of minimum-unit data from every predetermined number of compression process units.

4. The digital dubbing device according to claim 1, wherein the data count unit detects the data stream of the predetermined number of minimum-unit data from a compression process unit including an end part of the program data.

5. The digital dubbing device according to claim 1, further comprising a compression-process-unit counter that counts the number of compression process units of the digital signal after compression, wherein the frame detector determines a position to start detecting the boundary frame based on the number of compression process units counted by the compression-process-unit counter and the index information.

6. The digital dubbing device according to claim 5, wherein
   the detection of the boundary frame starts from a position a predetermined number of frames before the boundary frame, and
   when the storing is to be restarted, the signal output unit outputs the digital signal from a frame the predetermined number of frames before the boundary frame.

7. The digital dubbing device according to claim 5, wherein
   the compression-process-unit counter detects a compression process unit after compression including the end part of the program data, based on the number of compression process units counted by the compression-process-unit counter and the total number of compression process units counted from one of the program data by the data count unit, and
   the controller causes the program data to be stored for each program data based on the compression process unit after compression including the end part of the program data.

* * * * *